(12) United States Patent
Shah

(10) Patent No.: US 12,490,171 B2
(45) Date of Patent: Dec. 2, 2025

(54) ROUTING AN EMERGENCY CALL MADE THROUGH A NON-TERRESTRIAL NETWORK

(71) Applicant: T-Mobile USA, Inc., Bellevue, WA (US)

(72) Inventor: Mehul Jayant Shah, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 335 days.

(21) Appl. No.: 18/067,694

(22) Filed: Dec. 16, 2022

(65) Prior Publication Data

US 2024/0205792 A1    Jun. 20, 2024

(51) Int. Cl.
*H04W 40/24* (2009.01)
*H04L 65/1045* (2022.01)
*H04W 4/90* (2018.01)
*H04W 84/06* (2009.01)

(52) U.S. Cl.
CPC ....... *H04W 40/248* (2013.01); *H04L 65/1045* (2022.05); *H04W 4/90* (2018.02); *H04W 84/06* (2013.01)

(58) Field of Classification Search
None
See application file for complete search history.

(56) References Cited

U.S. PATENT DOCUMENTS

| | | | |
|---|---|---|---|
| 5,303,286 A * | 4/1994 | Wiedeman | H04B 7/18556 370/335 |
| 5,448,623 A * | 9/1995 | Wiedeman | H04B 7/18556 455/433 |
| 5,586,165 A * | 12/1996 | Wiedeman | H04B 7/18556 455/13.1 |

(Continued)

FOREIGN PATENT DOCUMENTS

| | | | |
|---|---|---|---|
| CA | 2936589 C * | 9/2023 | ............ H04W 4/025 |
| CN | 101415195 B * | 5/2011 | |

(Continued)

OTHER PUBLICATIONS

International Search Report and Written Opinion received in International Application No. PCT/US2023/074947 mailed on Jan. 23, 2024, 10 pages.

(Continued)

*Primary Examiner* — Christopher T Wyllie
(74) *Attorney, Agent, or Firm* — Foley IP Law, PLLC

(57) ABSTRACT

Solutions for routing an emergency call made through a non-terrestrial network (NTN) include: receiving, by an NTN, from a user equipment (UE), an emergency call; not selecting, by the NTN, a public safety answering point (PSAP) for routing the emergency call; selecting, by the NTN, a packet data network (PDN) gateway (GW) in a terrestrial network (TN) to which to route the emergency call; and routing the emergency call to the selected PDN GW. Solutions also include: receiving, by the TN, from the NTN, the emergency call placed by the UE that is using the (Continued)

NTN; determining, by the TN, a location of the UE; selecting, by the TN, a PSAP using the location of the UE; and routing the emergency call to the selected PSAP.

20 Claims, 6 Drawing Sheets

(56) References Cited

U.S. PATENT DOCUMENTS

| | | | | |
|---|---|---|---|---|
| 2009/0291663 | A1* | 11/2009 | Schultz | H04M 3/465 |
| | | | | 455/404.2 |
| 2016/0295386 | A1* | 10/2016 | Faccin | H04W 4/029 |
| 2016/0366574 | A1* | 12/2016 | Dahan | H04W 4/90 |
| 2019/0098133 | A1* | 3/2019 | Poikselka | H04M 7/006 |
| 2019/0207747 | A1* | 7/2019 | Durvasula | H04L 61/2592 |
| 2020/0099443 | A1* | 3/2020 | Ravishankar | H04W 72/542 |
| 2020/0259853 | A1* | 8/2020 | Alfano | H04L 43/0876 |
| 2022/0150812 | A1* | 5/2022 | Lin | H04W 60/04 |
| 2022/0264278 | A1* | 8/2022 | Edge | H04B 7/18547 |
| 2022/0360962 | A1* | 11/2022 | Tseng | H04W 8/183 |
| 2023/0079636 | A1* | 3/2023 | Edge | H04W 60/04 |
| | | | | 370/316 |
| 2023/0209322 | A1* | 6/2023 | Shrivastava | H04W 4/90 |
| | | | | 455/404.2 |
| 2023/0319929 | A1* | 10/2023 | Shrestha | H04W 76/27 |
| | | | | 370/329 |
| 2023/0362704 | A1* | 11/2023 | Edge | H04W 24/10 |
| 2024/0205792 | A1* | 6/2024 | Shah | H04W 4/90 |
| 2025/0016721 | A1* | 1/2025 | Edge | H04W 64/00 |

FOREIGN PATENT DOCUMENTS

| | | | | |
|---|---|---|---|---|
| CN | 118972824 | A * | 11/2024 | H04B 7/18513 |
| WO | WO-2005006802 | A1 * | 1/2005 | H04L 67/56 |
| WO | WO-2019055833 | A1 * | 3/2019 | H04B 7/18563 |
| WO | WO-2021233980 | A1 * | 11/2021 | H04B 7/1851 |
| WO | WO-2022177859 | A1 * | 8/2022 | H04L 65/1016 |
| WO | WO-2022200682 | A1 * | 9/2022 | H04W 56/006 |
| WO | WO-2022217613 | A1 * | 10/2022 | H04W 72/04 |
| WO | WO-2024173772 | A1 * | 8/2024 | H04W 64/00 |
| WO | WO-2024224591 | A1 * | 10/2024 | H04W 64/00 |

OTHER PUBLICATIONS

Nokia et al: "Limited service emergency call over satellite", 3GPP Draft; S2-2201004, 3rd Generation Partnership Project (3GPP), Mobile Competence Centre ; 650, Route Des Lucioles ; F-06921 Sophia-Antipolis Cedex ; France , vol. SA WG2, No. Elbonia; Feb. 14, 2022-Feb. 25, 2022 Jan. 28, 2022, Retrieved at:https://ftp.3gpp.org/tsg_sa/WG2_Arch/TSGS2_149E_Electronic_2022-02/Docs/S2-2201004.zip, 3 pages.

* cited by examiner

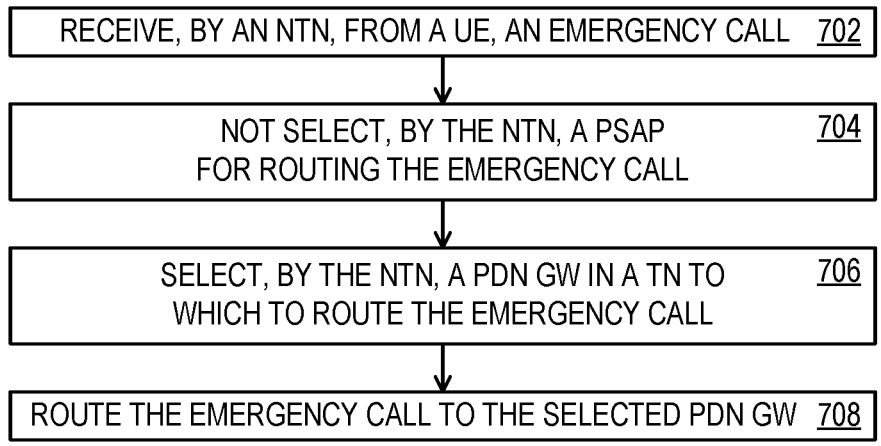
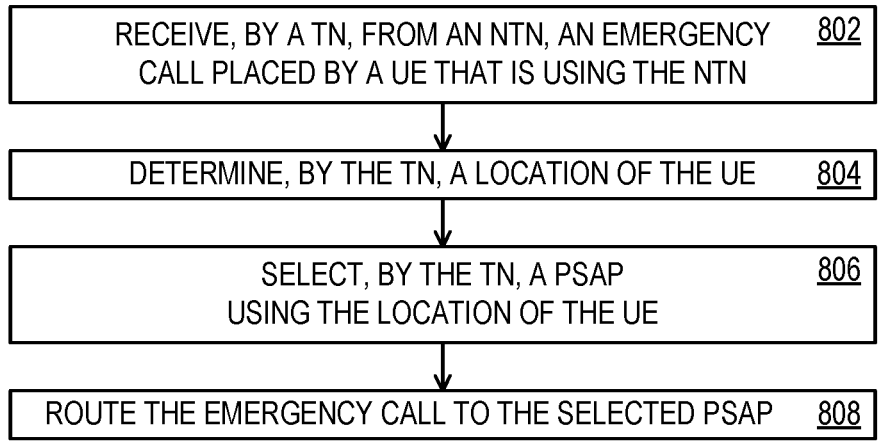
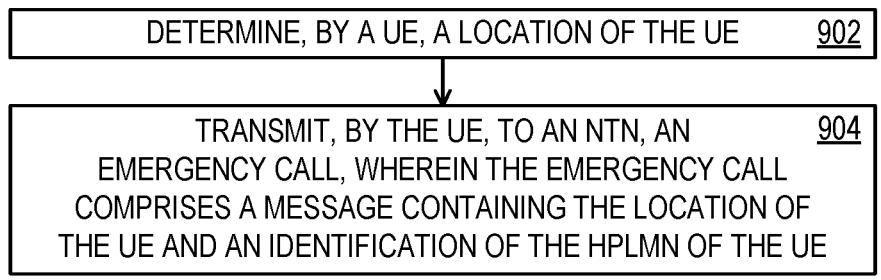

ROUTING AN EMERGENCY CALL MADE THROUGH A NON-TERRESTRIAL NETWORK

BACKGROUND

Non-terrestrial networks (NTNs) complement ground-based terrestrial networks (TNs), such as cellular networks, by offering coverage in remote locations where it is difficult for TNs to offer services. NTN service providers may partner with TN service providers by leasing radio spectrum and acting as a roaming carrier (e.g., a serving/visited network).

Cellular networks are configured to comply with standardized operations, such as those produced by Third Generation Partnership Project (3GPP). 3GPP technical standard (TS) 23.401 is one of the controlling TSs for cellular network, and currently requires that emergency calls, such as enhanced 911 (E911) calls, are to be handled by the serving/visited network. This means that the NTN, acting as a serving/visited network is required to handle routing of the E911 to a public safety answering point (PSAP). A PSAP is a call center for answering emergency calls, such as 911 calls. However, there thousands of PSAPs in the USA alone. Handling the selection of and routing to each PSAP requires a significant investment in infrastructure, driving up costs for NTNs.

SUMMARY

The following summary is provided to illustrate examples disclosed herein, but is not meant to limit all examples to any particular configuration or sequence of operations.

Solutions for routing an emergency call made through a non-terrestrial network (NTN) include: receiving, by an NTN, from a user equipment (UE), an emergency call: not selecting, by the NTN, a public safety answering point (PSAP) for routing the emergency call; selecting, by the NTN, a packet data network (PDN) gateway (GW) in a terrestrial network (TN) to which to route the emergency call: and routing the emergency call to the selected PDN GW. Solutions also include: receiving, by the TN, from the NTN, the emergency call placed by the UE that is using the NTN: determining, by the TN, a location of the UE; selecting, by the TN, a PSAP using the location of the UE; and routing the emergency call to the selected PSAP. Solutions also include: determining, by the UE, the location of the UE; transmitting, by the UE, to the NTN, an emergency call, wherein the emergency call comprises a message containing the location of the UE and an identification of the home public land mobile network (HPLMN) of the UE.

BRIEF DESCRIPTION OF THE DRAWINGS

The disclosed examples are described below with reference to the accompanying drawing figures listed below, wherein:

FIGS. 7-9 illustrates additional flowcharts of exemplary operations associated with examples of the architecture of FIG. 1.

Figure 1:
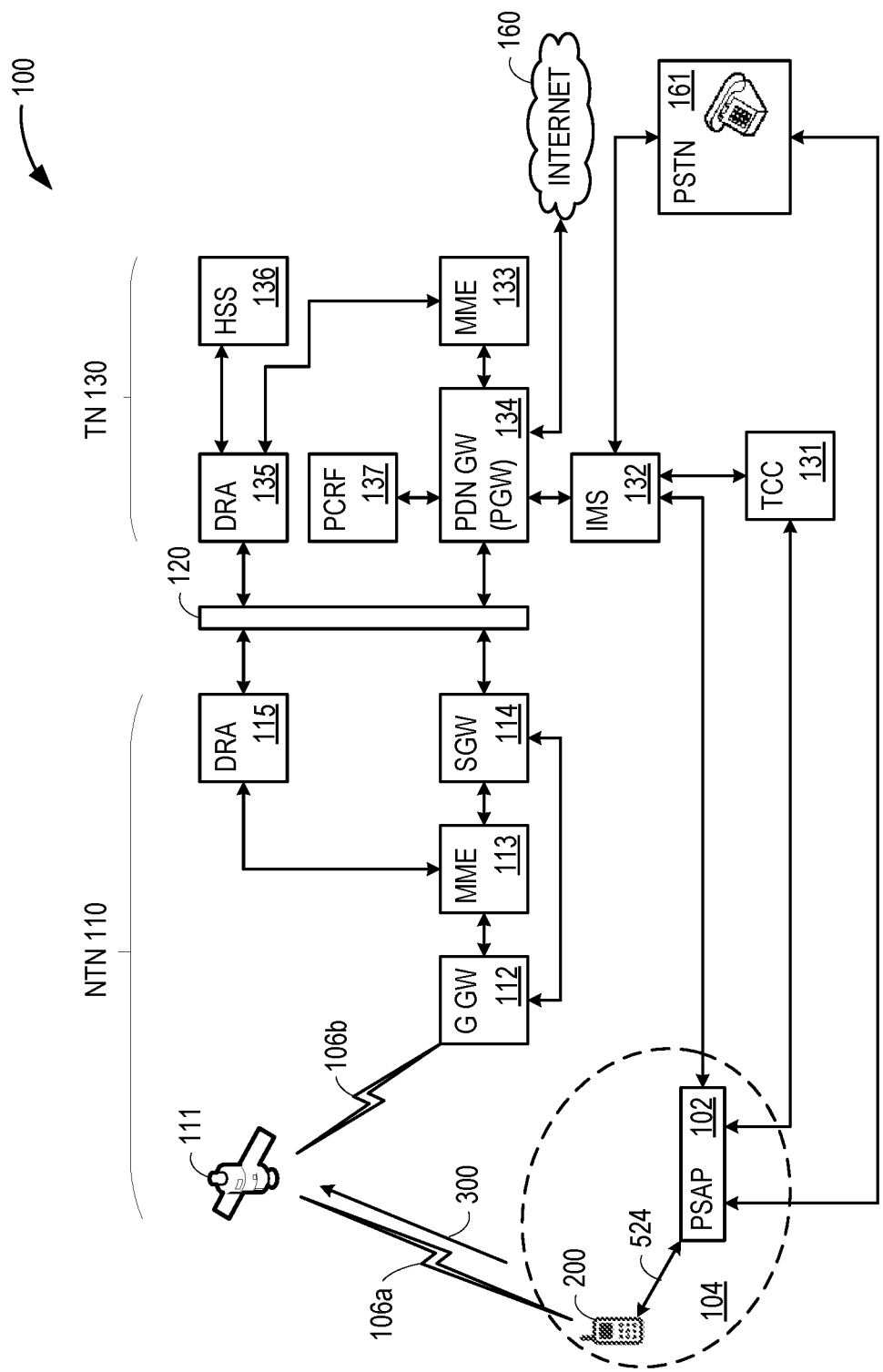
FIG. 1 illustrates an exemplary architecture that advantageously routes emergency calls made through a non-terrestrial network (NTN)

Corresponding reference characters indicate corresponding parts throughout the drawings, where practical. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions for routing an emergency call made through a non-terrestrial network (NTN) include: receiving, by an NTN, from a user equipment (UE), an emergency call: not selecting, by the NTN, a public safety answering point (PSAP) for routing the emergency call; selecting, by the NTN, a packet data network (PDN) gateway (GW) in a terrestrial network (TN) to which to route the emergency call: and routing the emergency call to the selected PDN GW. Solutions also include: receiving, by the TN, from the NTN, the emergency call placed by the UE that is using the NTN: determining, by the TN, a location of the UE; selecting, by the TN, a PSAP using the location of the UE; and routing the emergency call to the selected PSAP. Solutions also include: determining, by the UE, the location of the UE; transmitting, by the UE, to the NTN, an emergency call, wherein the emergency call comprises a message containing the location of the UE and an identification of the home public land mobile network (HPLMN) of the UE.

Aspects of the disclosure improve public safety while improving efficiency for NTN operations. An NTN is able to advantageously delegate the responsibility of routing emergency calls, such as enhanced 911 (E911) or E112 calls, to the home network of the UE or any other designated TN, rather than the NTN routing the emergency calls to the PSAP themselves. An E911 call automatically provide the caller's location to 911 dispatchers. 911 is the universal emergency number in at least North America. In the European Union (EU), the emergency number is 112, and so emergency calls over cellular networks are E112 calls. Emergency calls placed from some vehicles are termed eCalls.

By permitting an established TN, which already has a proven infrastructure for routing emergency calls to the proper PSAP, to handle emergency calls for an NTN, the NTN does not need to invest resources in a duplication of effort. The intent behind the requirement for a serving network to handle emergency calls, rather than routing the emergency call through the caller's home network, is that, due to the geographical distribution of traditional cellular networks and the communication range of traditional cellular telephones, the PSAP that is closest to the caller is also likely in the same geographical area as serving network. Because NTNs communicate with UE using satellites, assumptions about geographical locations of network coverage may not apply to the same degree as with TNs.

With reference now to the figures, FIG. 1 illustrates an architecture 100 that advantageously routes emergency calls made through an NTN 110. In architecture 100, a UE 200 is in the vicinity of a PSAP 102 and so is within a jurisdiction 104 of PSAP 102. Jurisdiction 104 is the area of responsibility for PSAP 102 so that a caller having an emergency within jurisdiction 104 should have their emergency call routed to PSAP 102 o that PSAP 102 is able to dispatch the proper responders (e.g., police, file, ambulance responders).

UE 200 is being served by an NTN 110, so that NTN 110 acts as a visiting public land mobile network (VPLMN) for UE 200. A public land mobile network (PLMN) is a combination of wireless communication services, such as cellular communication services, offered by a specific operator in a specific location. UE 200 has a home PLMN (HPLMN) that holds subscriber information for UE 200. For example, a user of UE 200 will be a customer of the HPMLN of UE 200 and the HPMLN of UE 200 will be a TN.

When UE 200 moves outside the coverage of its HPMLN into a region covered by another TN, and the UE 200 has roaming coverage, that other TN is a visiting PLMN (VPLMN). In the scenario illustrated in FIG. 1, however, when UE 200 is being served by NTN 110, NTN 110 is a roaming carrier for UE 200, interfacing with the HPMLN of UE 200 similarly to a roaming TN. Thus, NTN 110 is acting as a VPLMN for UE 200, even though NTN has a non-terrestrial component, a satellite 111. In some scenarios, TN 130 is the HPMLN for UE 200. However, in other scenarios, TN 130 is not the HPMLN for UE 200, but is instead only designated to handle emergency calls in place of the HPMLN for UE 200.

UE 200 communicates with NTN 110 via an air interface 106a with satellite 111. Satellite 111 communicates with a ground-based gateway (G GW 112) via an air interface 106b. G GW 112 is communicatively connected to a mobility management entity (MME) 113 of NTN 110 and a serving gateway (SGW) 114. MME 113 communicatively connected to SGW 114 and a diameter routing agent (DRA) 115. An MME is a control-node for cellular networks, and since NTN 110 is acting as a cellular network, NTN 110 has its own MME. An MME is responsible UE paging for choosing the serving gateway. A DRA is a functional element that ensures messages are routed among the correct elements in a network.

NTN 110 is connected to a TN 130 via an interconnect 120. TN 130 has a DRA 135, a home subscriber server (HSS) 136, a PDN GW 134, a policy and charging rules function (PCRF) 137, an MME 133, an internet protocol (IP) multimedia system (IMS) IMS core 132, and a text control center (TCC) 131. In some uses, a PDN GW is also referred to as a packet gateway (PGW). An HSS is a subscriber database that provides subscriber information to other nodes of TN 130. A PCRF accesses subscriber databases in real time and initiates dedicated bearers for IMS services. An IMS provides an architectural framework for delivering IP-based multimedia services. Interconnect 120 may use internetwork packet exchange (IPX) or IP security (IPsec) protocols.

DRA 135 is communicatively connected to HSS 136 and MME 133. PDN GW 134 communicatively connected to PCRF 137, MME 113, IMS core 132, and the internet 160. IMS core 132 is also IMS core 132 to the public switched telephone network (PSTN) 161, TCC 131, and PSAP 102. TCC 131 processes text messages sent between IMS core 132 and PSAP 102. PSAP 102 is also communicatively connected to PSTN 161.

When UE 200 places an emergency call 300 through NTN 110, NTN 110 uses information stored within MME 113 to select PDN GW 134 in TN 130, and routes emergency call 300 to PDN GW 134. TN 130 uses information stored within MME 133 to select PSAP 102 and routes emergency call 300 to PSAP 102. A voice session 528 is set up for emergency call 300 to enable the caller using UE 200 to speak with an emergency dispatcher within PSAP 102.

In some examples, TN 130 comprises a fifth-generation technology (5G) cellular network, a fourth-generation technology (4G) cellular network, or another network (e.g., a future 6G network). In some examples, NTN 110 emulates a 5G cellular network or another network (e.g., a future 6G network).

Figure 2:
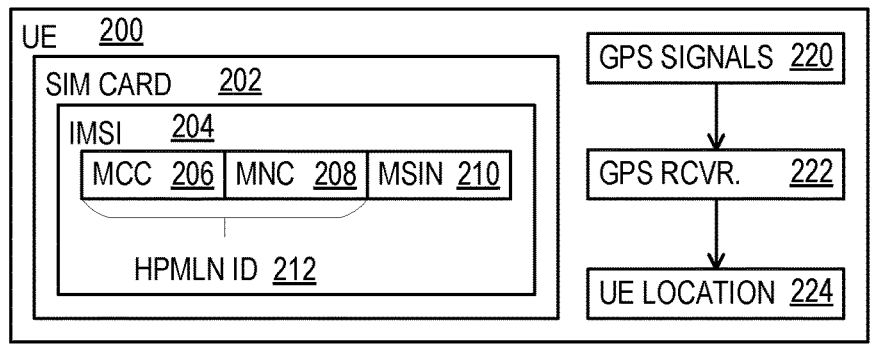
FIG. 2 illustrates further detail for the user equipment (UE) of FIG. 1.

FIG. 2 illustrates further detail for UE 200. UE 200 has a subscriber identity module (SIM) card 202 that holds an international mobile subscriber identity (IMSI) 204. IMSI 204 includes a mobile country code (MCC) 206, a mobile network code (MNC) 208, and a mobile subscription identification number (MSIN) 210. Together, MCC 206 and MNC 208 form an HPMLN identifier (ID) 212 for UE 200. This is because MCC 206 is the MCC in the country in which TN 130 is located, and MNC 208 is the MNC for TN 130 within that country. MSIN 210 is a unique numeric code used to identify UE 200 by the HPMLN of UE 200. In some examples, IMSI 204 has 15 digits. In some examples, NTN 110 uses a non-geographic MCC such as 901.

UE 200 sends its own location 224 in E911 and E112 calls. To determine its own location 224, UE 200 receives global positioning system (GPS) signals 220 and decodes them using a GPS receiver 222. In some examples, location 224 is expressed using GPS coordinates.

Figure 3:
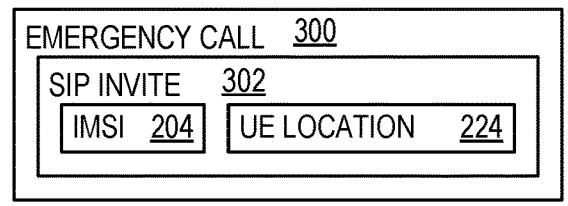
FIG. 3 illustrates further detail for the emergency call of FIG. 1.

FIG. 3 illustrates further detail for emergency call 300. In some examples, emergency call 300 comprises a session initiation protocol (SIP) invite 302. Emergency call 300 contains UE location 224 and at least HPLMN ID 212. In some examples, emergency call 300 has the entirety of IMSI 204, and HPLMN ID 212 is included as part of IMSI 204. In some examples, UE location 224 and IMSI 204 are within SIP invite 302.

Figure 4:
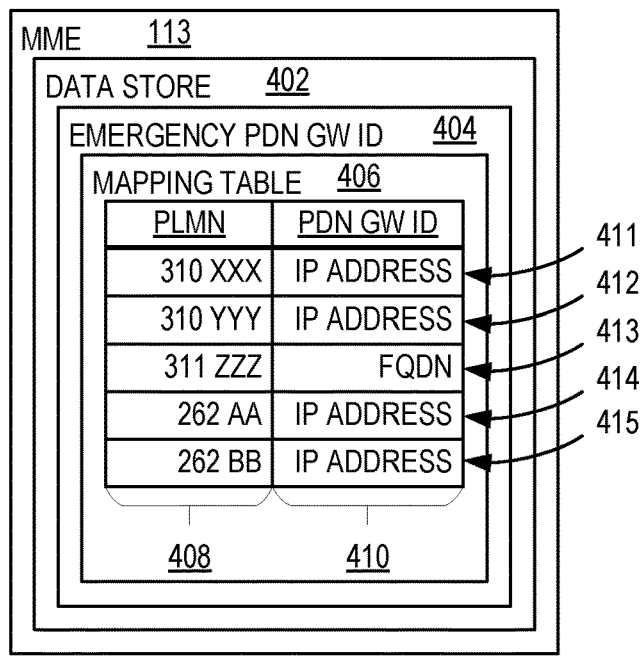
FIG. 4 illustrates further detail for one of the components of the architecture of FIG. 1.

FIG. 4 illustrates further detail for MME 113 of NTN 110. MME 113 has a data store 402 that holds database containing an Emergency PDN GW Identity field 404. The contents of a traditional Emergency PDN GW Identity field are specified in Third Generation Partnership Project (3GPP) technical standard (TS) 23.401, Table 5.7.2-1. However, Emergency PDN GW Identity field 404 instead has a mapping table 406.

Mapping table 406 has a PLMN column 408 and a PDN GW Identity (ID) column 410. As shown, mapping table 406 has five (5) rows of table entries, although it should be understood that some implementations may use a different number of rows. A table entry 411 maps a PLMN value of 310 XXX to an IP address for a PDN GW, and a table entry 412 maps a PLMN value of 310 310 YYY to an IP address for a PDN GW. A table entry 413 maps a PLMN value of 310 ZZZ to a fully qualified domain name (FQDN) for a PDN GW. A table entry 414 maps a PLMN value of 262 AA to an P address for a PDN GW, and a table entry 415 maps a PLMN value of 262 BB to an IP address for a PDN GW. PDN GWs identified in the various table entries of mapping table 406 may all be different, or some may be common to two or more table entries. A PLMN value prefix of 310 or 310 indicates a PLMN located within North America, and a PLMN value prefix of 310 or 310 indicates a PLMN located within Germany. Other countries use various different PLMN value prefixes.

When MME 113 receives emergency call 300 (e.g., receives SIP invite 302), MME 113 extracts HPMLN ID 212 and locates a matching value within PLMN column 408. The corresponding PDN GW identity (either an IP address or an FQDN) in PDN GW ID column 410 is found. This is how NTN 110 selects PDN GW 134 for UE 200.

The table entries in mapping table 406 may map a PLMN value to a PDN GW within that same PLMN or instead may map a PLMN value to a PDN GW within a different PLMN. When a PLMN value is mapped to a PDN GW within that same PLMN, any UE providing that PLMN as the HPLMN ID within an emergency call will have its call routed to its HPLMN. However, when a PLMN value is mapped to a PDN GW within a different PLMN, the UE will have its emergency calls routed to a designated PLMN other than its HPLMN.

Various schemes may be used to determine which TNs provide routing for emergency calls. For larger TNs, each TN may accept and route emergency calls for their own subscribers (e.g., the UE's emergency call is routed to the UE's HPMLN), and also may host emergency calls for smaller TNs and cellular carrier resellers (e.g., the UE's emergency call is routed to a designated HPMLN—not the UE's HPMLN).

In contrast with the operation of MME 113, when PDN GW 134 receives emergency call 300, MME 133 of TN 130 retains the traditional Emergency PDN GW identity field, specified by 3GPP TS 23.401 that identifies PSAP 102.

Figure 5:
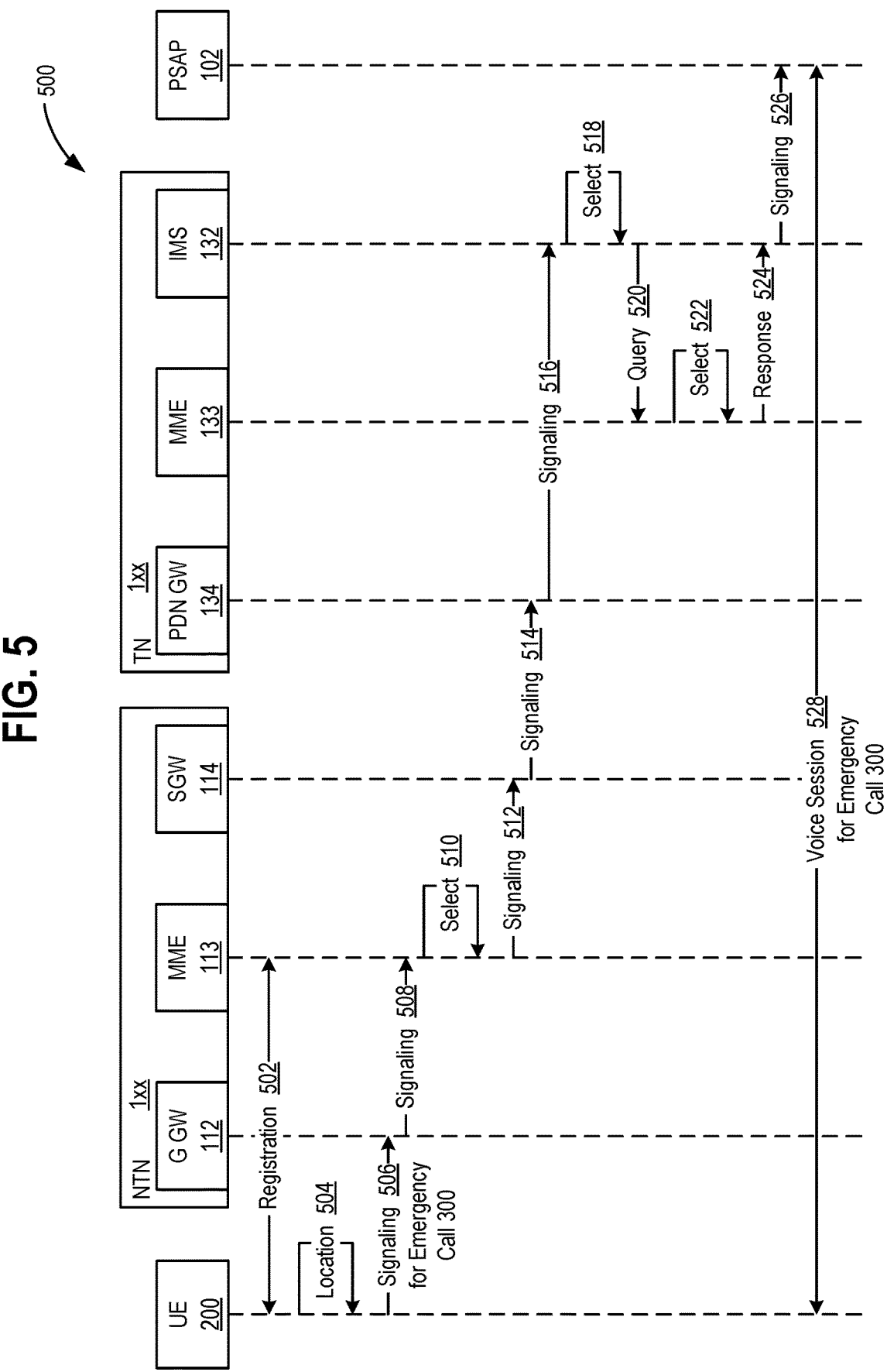
FIG. 5 illustrates a message sequence diagram (also known as a swimlane figure) showing example messages that may occur in the architecture of FIG. 1.

FIG. 5 illustrates a message sequence diagram 500 showing example messages that may occur in architecture 100. UE 200 registers for voice services with NTN 110 using messages 502. UE 200 obtains its location at 504 and initiates emergency call 300 using SIP invite 302 in a message 506 via satellite 111 to G GW 112. G GW 112 forwards emergency call 300 to MME 113 using a message 508. MME 113 selects PDN GW 134 at 510 and informs SGW 114 using a message 512.

SGW 114 forwards emergency call 300 to PDN GW 134 using a message 514, which routes emergency call 300 IMS core 132 using a message 516. In some examples. IMS core 132 routes emergency call 300 to PSAP 102 according to procedures specified in 3GPP TS 23.167. In some samples, IMS core 132 has its own table to identify PSAP 102 based on location 224 of UE 200. In such examples, IMS core 132 selects PSAP 102 at 518.

However, in some examples, IMS core 132 leverages Emergency PDN GW Identity field 404 stored in MME 133. In such examples, IMS core 132 queries MME 133 using a query 520, MME 133 selects PSAP 102 at 522, and responds to IMS core 132 with the identification of PSAP 102 in a response 524.

In either case, when IMS core 132 identifies PSAP 102 as the proper PSAP for location 224 of UE 200, IMS core 132 routes emergency call 300 to PSAP 102 using a message 526. Voice session 528 is set up for emergency call 300 to enable the caller using UE 200 to speak with an emergency dispatcher within PSAP 102.

Figure 6:
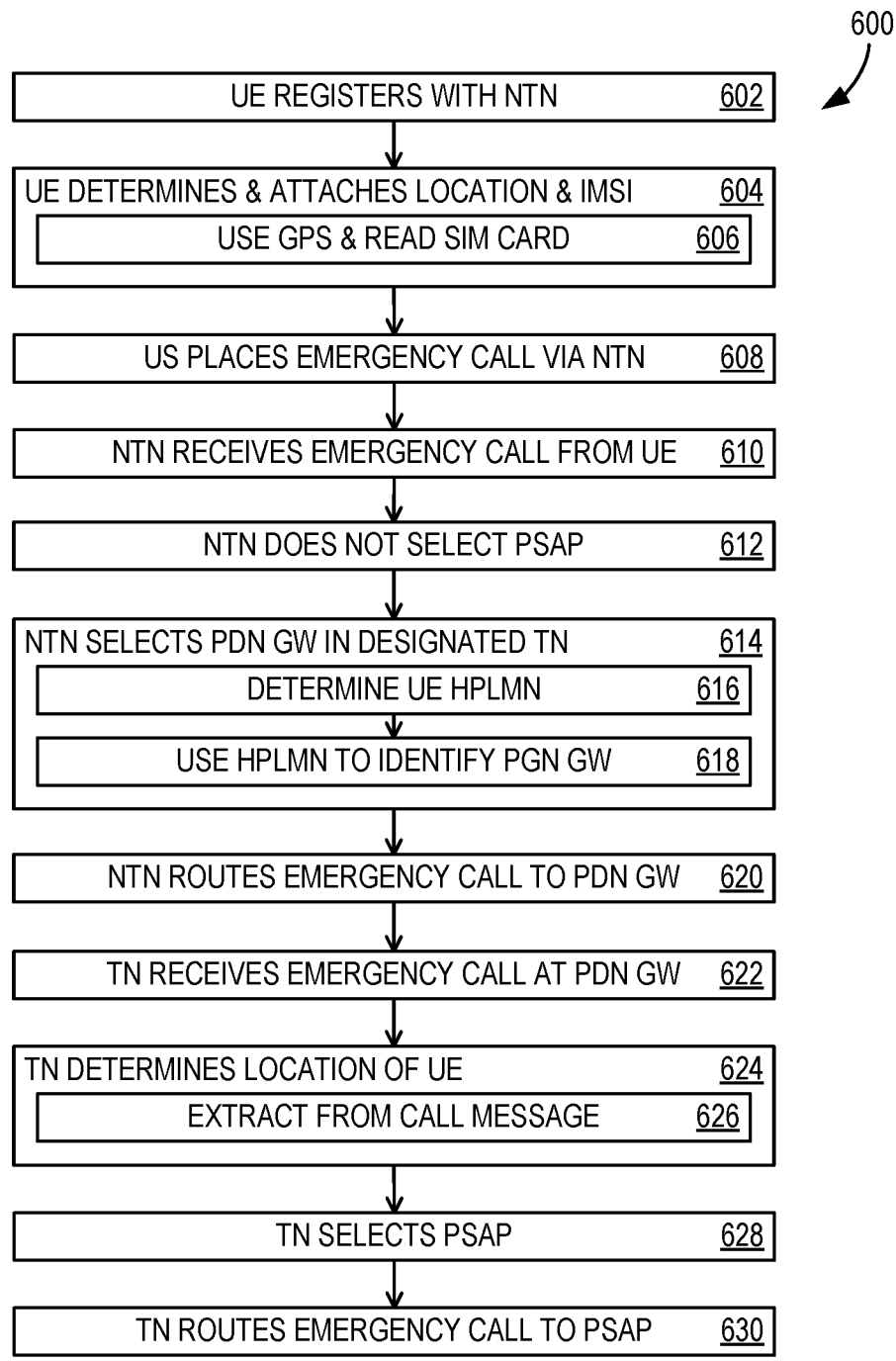
FIG. 6 illustrates a flowchart of exemplary operations associated with examples of the architecture of FIG. 1.

FIG. 6 illustrates a flowchart 600 of exemplary operations associated with routing emergency call 300 through NTN 110 in architecture 100. In some examples, at least a portion of flowchart 600 may be performed using one or more computing devices 1000 of FIG. 10 (e.g., any of the network nodes of architecture 100 may use examples of computing device 1000). Flowchart 600 commences with UE 200 registering with NTN 110, for voice call services in operation 602, so that NTN 110 provides voice call services as a serving network for UE 200.

UE 200 determines its location 224 in operation 604. Operation 604 is performed using operation 606 in which GPS receiver 222 derives location 224 of UE 200 from GPS signals 220 received by UE 200.

UE 200 transmits emergency call 300 to NTN 110 in operation 608. Emergency call 300 comprises a message containing location 224 of UE 200 and HPLMN ID 212, which is identification of the HPLMN of UE 200. In some examples, emergency call 300 comprises an E911 voice call or an E112 voice call. In some examples, transmitting emergency call 300 to NTN 110 comprises transmitting SIP invite 302 and SIP invite 302 contains location 224. In some examples, transmitting emergency call 300 by UE 200 comprises transmitting IMSI 204 of SIM card 202 within UE 200. In some examples, IMSI 204 is stored within SIM card 202 within UE 200. In some examples, the HPLMN of UE 200 is identified within IMSI 204.

NTN 110 receives emergency call 300 from UE 200 in operation 610. In some examples, receiving emergency call 300 by NTN 110 comprises receiving SIP invite 302. As indicated in box 612, NTN 110 does not select a PSAP for routing emergency call 300 (i.e., NTN 110 does not select a PSAP 102). Instead, NTN 110 determines a PDN GW indicated as handling emergency calls for the HPLMN of UE 200.

Operation 614 uses operations 616 and 618 to select PDN GW 164 within TN 130 to which to route emergency call 300, in operation 614. In some examples, TN 130 is the HPLMN of UE 200, although in some other examples, TN 130 is not an HPLMN of UE 200 and is instead a designated PLMN that is designated for routing emergency calls from UE 200. Operation 616 determines the HPLMN of UE 200. In some examples, determining the HPLMN of UE 200 comprises receiving, from UE 200, at least a portion of IMSI 204 of UE 200. In some examples, determining the HPLMN of UE 200 comprises receiving HPLMN ID 212 from UE 200, and/or identifying MCC 206 and MNC 208. In some examples, the HPLMN of UE 200 is TN 130 having selected PDN GW 164. In some examples, the HPLMN of UE 200 is a different TN than TN 130 having selected PDN GW 164:

Operation 618 uses the HPMLN of UE 200 to identify PDN GW 164. In some examples, this comprises identifying PDN GW 164 in an Emergency PDN GW Identity field 404. This may involve identifying PDN GW 164 in mapping table 406 stored in MME 113 of NTN 110. In some examples, identifying PDN GW 164 comprises identifying an FQDN of PDN GW 164 or an IP address of PDN GW 164. Operation 620 routes emergency call 300 to selected PDN GW 164. In some examples, routing emergency call 300 to selected PDN GW 164 comprises forwarding SIP invite 302 to selected PDN GW 164.

TN 130 receives emergency call 300 from NTN 110 in operation 622. In some examples, receiving emergency call 300 by TN 130 comprises receiving SIP invite 302 from NTN 110. In operation 624, TN 130, location 224 of UE 200. Some examples perform operation 624 using operation 626, in which TN 130 extracts location 224 of UE 200 from received emergency call 300 (e.g., from within SIP invite 302).

TN 130 selects PSAP 102 using location 224 of UE 200 in operation 628. In some examples, selecting PSAP 102 by TN 130 comprises using MME 133 of TN 130, specifically an Emergency PDN GW Identity field stored within a database within MME 133. In some examples, selecting PSAP 102 comprises determining a PSAP having jurisdiction 104 that includes location 224 of UE 200. In operation 630, TN 130 routes emergency call 300 to selected PSAP 102.

FIG. 7 illustrates a flowchart 700 of exemplary operations associated with examples of architecture 100 routing an emergency call made through an NTN. In some examples, at least a portion of flowchart 700 may be performed using one or more computing devices 1000 of FIG. 10. Flowchart 700 commences with operation 702, which includes receiving, by an NTN, from a UE, an emergency call. As indicated by 704, the NTN does not select a PSAP for routing the emergency call. Operation 706 includes selecting, by the NTN, a PDN GW in a TN to which to route the emergency call, and operation 708 includes routing the emergency call to the selected PDN GW.

FIG. 8 illustrates a flowchart 800 of exemplary operations associated with examples of architecture 100. In some examples, at least a portion of flowchart 800 may be performed using one or more computing devices 1000 of FIG. 10. Flowchart 800 commences with operation 802, which includes receiving, by a TN, from an NTN, an emergency call placed by a UE that is using the NTN. Operation 804 includes determining, by the TN, a location of the UE. Operation 806 includes selecting, by the TN, a PSAP using the location of the UE. Operation 808 includes routing the emergency call to the selected PSAP.

FIG. 9 illustrates a flowchart 900 of exemplary operations associated with examples of architecture 100. In some examples, at least a portion of flowchart 900 may be performed using one or more computing devices 1000 of FIG. 10. Flowchart 900 commences with operation 902, which includes determining, by a UE, a location of the UE. Operation 904 includes transmitting, by the UE, to an NTN, an emergency call, wherein the emergency call comprises a message containing the location of the UE and an identification of a HPLMN of the UE.

Figure 10:
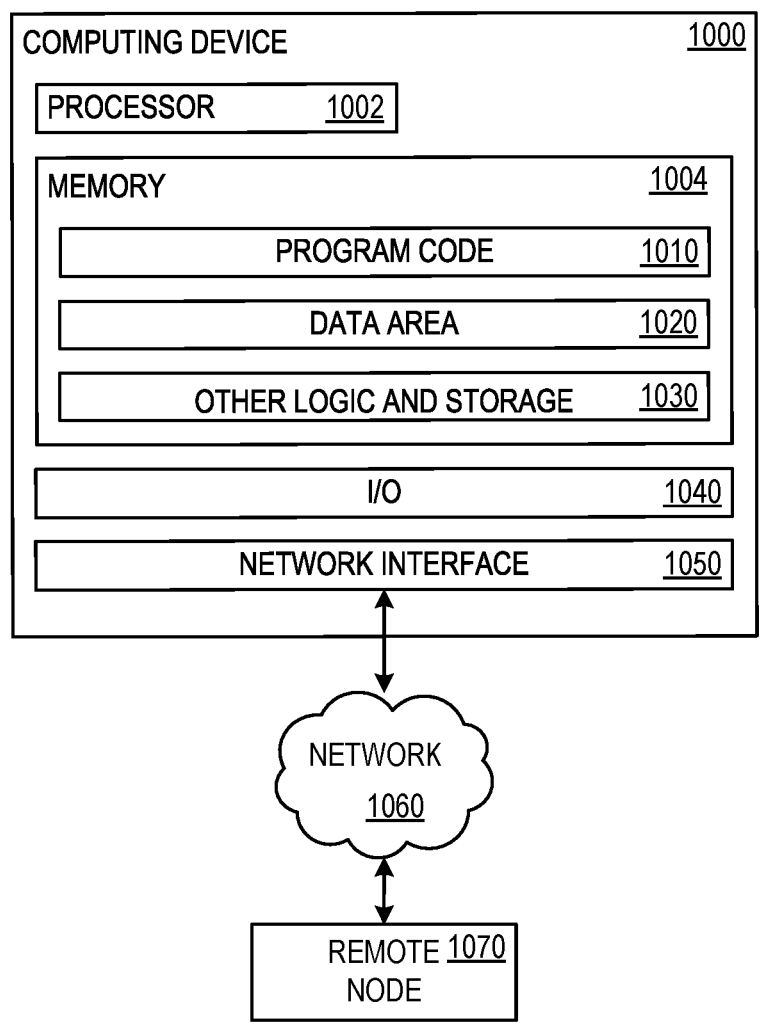
FIG. 10 illustrates a block diagram of a computing device suitable for implementing various aspects of the disclosure.

FIG. 10 illustrates a block diagram of computing device 1000 that may be used as any component described herein that may require computational or storage capacity. Computing device 1000 has at least a processor 1002 and a memory 1004 that holds program code 1010, data area 1020, and other logic and storage 1030. Memory 1004 is any device allowing information, such as computer executable instructions and/or other data, to be stored and retrieved. For example, memory 1004 may include one or more random access memory (RAM) modules, flash memory modules, hard disks, solid-state disks, persistent memory devices, and/or optical disks. Program code 1010 comprises computer executable instructions and computer executable components including any instructions necessary to perform operations described herein. Data area 1020 holds any data necessary to perform operations described herein. Memory 1004 also includes other logic and storage 1030 that performs or facilitates other functions disclosed herein or otherwise required of computing device 1000. An input/output (I/O) component 1040 facilitates receiving input from users and other devices and generating displays for users and outputs for other devices. A network interface 1050 permits communication over a network 1060 with a remote node 1070, which may represent another implementation of computing device 1000. For example, a remote node 1070 may represent another of the above-noted nodes within architecture 100.

Additional Examples

An example method of routing an emergency call made through an NTN comprises: receiving, by an NTN, from a UE, an emergency call: not selecting, by the NTN, a PSAP for routing the emergency call: selecting, by the NTN, a PDN GW in a TN to which to route the emergency call: and routing the emergency call to the selected PDN GW.

An example system for routing an emergency call made through an NTN comprises: a processor; and a computer-readable medium storing instructions that are operative upon execution by the processor to: receive, by an NTN, from a UE, an emergency call: not select, by the NTN, a PSAP for routing the emergency call: select, by the NTN, a PDN GW in a TN to which to route the emergency call: and route the emergency call to the selected PDN GW.

One or more example computer storage devices has computer-executable instructions stored thereon, which, upon execution by a computer, cause the computer to perform operations comprising: receiving, by an NTN, from a UE, an emergency call: not selecting, by the NTN, a PSAP for routing the emergency call: selecting, by the NTN, a PDN GW in a TN to which to route the emergency call: and routing the emergency call to the selected PDN GW.

Another example method of routing an emergency call made through an NTN comprises: receiving, by a TN, from an NTN, an emergency call placed by a UE that is using the NTN; determining, by the TN, a location of the UE: selecting, by the TN, a PSAP using the location of the UE; and routing the emergency call to the selected PSAP.

An example method of placing an emergency call made by a UE through an NTN comprises: determining, by a UE, a location of the UE; transmitting, by the UE, to an NTN, an emergency call, wherein the emergency call comprises a message containing the location of the UE and an identification of the HPLMN of the UE.

Alternatively, or in addition to the other examples described herein, examples include any combination of the following:

- the emergency call comprises an E911 voice call or an E112 voice call;
- receiving the emergency call by the NTN comprises receiving a SIP invite
- routing the emergency call to the selected PDN GW. comprises forwarding the SIP invite to the selected PDN GW;
- selecting the PDN GW comprises determining a HPLMN of the UE;
- selecting the PDN GW comprises determining a PDN GW indicated as handling emergency calls for the HPLMN of the UE;
- the PDN GW is within the TN;
- selecting the PDN GW comprises identifying the PDN GW in an Emergency PDN GW identity field;
- selecting the PDN GW comprises identifying the PDN GW in a mapping table stored in an MME of the NTN;
- determining the HPLMN of the UE comprises receiving, from the UE, at least a portion of an IMSI of the UE;
- the UE comprises a cellular telephone;
- providing voice call services as a serving network, by the NTN, for the UE;
- the NTN acts as a VPLMN for the UE;
- the SIP invite contains the location of the UE;
- receiving the emergency call by the NTN comprises receiving the SIP invite from the UE;
- determining the HPLMN of the UE comprises receiving identification of the HPLMN from the UE;
- the HPLMN of the UE is identified within the IMSI of the UE;
- the IMSI of the UE is stored within the SIM card that is within the UE;
- determining the HPLMN of the UE comprises identifying an MCC and an MNC of the HPLMN;

the HPLMN of the UE is the TN having the selected PDN GW;

the HPLMN of the UE is a different TN than the TN having the selected PDN GW TN;

identifying the PDN GW comprises identifying an FQDN of the PDN GW or an IP address of the PDN GW;

receiving the emergency call by the TN comprises receiving a SIP invite from the NTN;

determining the location of the UE by the TN comprises extracting the location of the UE from the received emergency call;

selecting the PSAP comprises determining a PSAP having a jurisdiction that includes the location of the UE;

the TN is not a VPLMN of the UE;

the TN is not an HPLMN of the UE;

the TN is an HPLMN of the UE;

the TN is a designated PLMN that is designated for routing emergency calls from the UE;

selecting the PSAP by the TN comprises identifying the PSAP using an MME of the TN;

transmitting the emergency call to the NTN comprises transmitting a SIP invite;

registering, by the UE, with the NTN, for voice call services, so that the NTN comprises a serving network for the UE;

determining the location of the UE by the UE comprises deriving the location of the UE from GPS signals received by the UE;

transmitting the emergency call by the UE comprises transmitting an IMSI of a SIM card that is within the UE.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of routing an emergency call made through a non-terrestrial network (NTN), the method comprising:
   receiving, by an NTN, from a user equipment (UE), an emergency call;
   not selecting, by the NTN, a public safety answering point (PSAP) for routing the emergency call;
   selecting, by the NTN, a packet data network (PDN) gateway (GW) in a terrestrial network (TN) to which to route the emergency call; and
   routing the emergency call to the selected PDN GW.

2. The method of claim 1, wherein the emergency call comprises an E911 voice call or an E112 voice call.

3. The method of claim 1, wherein receiving the emergency call by the NTN comprises receiving a session initiation protocol (SIP) invite, and wherein routing the emergency call to the selected PDN GW, comprises forwarding the SIP invite to the selected PDN GW.

4. The method of claim 1, wherein selecting the PDN GW comprises:
   determining a home public land mobile network (HPLMN) of the UE; and
   determining a packet data network (PDN) gateway (GW) indicated as handling emergency calls for the HPLMN of the UE, wherein the PDN GW is within the TN.

5. The method of claim 4, wherein selecting the PDN GW comprises:
   identifying the PDN GW in an Emergency PDN GW identity field.

6. The method of claim 4, wherein selecting the PDN GW comprises:
   identifying the PDN GW in a mapping table stored in a mobility management entity (MME) of the NTN.

7. The method of claim 4, wherein determining the HPLMN of the UE comprises:
   receiving, from the UE, at least a portion of an international mobile subscriber identity (IMSI) of the UE.

8. A system for routing an emergency call made through a non-terrestrial network (NTN), the system comprising:
   a processor; and
   a computer-readable medium storing instructions that are operative upon execution by the processor to:
     receive, by an NTN, from a user equipment (UE), an emergency call;
     not select, by the NTN, a public safety answering point (PSAP) for routing the emergency call;
     select, by the NTN, a packet data network (PDN) gateway (GW) in a terrestrial network (TN) to which to route the emergency call; and
     route the emergency call to the selected PDN GW.

9. The system of claim 8, wherein the emergency call comprises an E911 voice call or an E112 voice call.

10. The system of claim 8, wherein receiving the emergency call by the NTN comprises receiving a session initiation protocol (SIP) invite, and wherein routing the emergency call to the selected PDN GW, comprises forwarding the SIP invite to the selected PDN GW.

11. The system of claim 8, wherein selecting the PDN GW comprises:
   determining a home public land mobile network (HPLMN) of the UE; and
   determining a packet data network (PDN) gateway (GW) indicated as handling emergency calls for the HPLMN of the UE, wherein the PDN GW is within the TN.

12. The system of claim 11, wherein selecting the PDN GW comprises:
   identifying the PDN GW in an Emergency PDN GW identity field.

13. The system of claim 11, wherein selecting the PDN GW comprises:
   identifying the PDN GW in a mapping table stored in a mobility management entity (MME) of the NTN.

14. The system of claim 11, wherein determining the HPLMN of the UE comprises:

receiving, from the UE, at least a portion of an international mobile subscriber identity (IMSI) of the UE.

15. One or more computer storage devices having computer-executable instructions stored thereon, which, upon execution by a computer, cause the computer to perform operations comprising:

receiving, by a non-terrestrial network (NTN), from a user equipment (UE), an emergency call;

not selecting, by the NTN, a public safety answering point (PSAP) for routing the emergency call;

selecting, by the NTN, a packet data network (PDN) gateway (GW) in a terrestrial network (TN) to which to route the emergency call; and routing the emergency call to the selected PDN GW.

16. The one or more computer storage devices of claim 15, wherein the emergency call comprises an E911 voice call or an E112 voice call.

17. The one or more computer storage devices of claim 15, wherein receiving the emergency call by the NTN comprises receiving a session initiation protocol (SIP) invite, and wherein routing the emergency call to the selected PDN GW, comprises forwarding the SIP invite to the selected PDN GW.

18. The one or more computer storage devices of claim 15, wherein selecting the PDN GW comprises:

determining a home public land mobile network (HPLMN) of the UE; and determining a packet data network (PDN) gateway (GW) indicated as handling emergency calls for the HPLMN of the UE, wherein the PDN GW is within the TN.

19. The one or more computer storage devices of claim 18, wherein selecting the PDN GW comprises:

identifying the PDN GW in an Emergency PDN GW identity field.

20. The one or more computer storage devices of claim 18, wherein selecting the PDN GW comprises:

identifying the PDN GW in a mapping table stored in a mobility management entity (MME) of the NTN.

* * * * *